May 2, 1933.  L. WICKENDEN  1,906,295
METHOD OF PREPARING FRUIT CONFECTIONS AND THE LIKE
Filed July 3, 1929
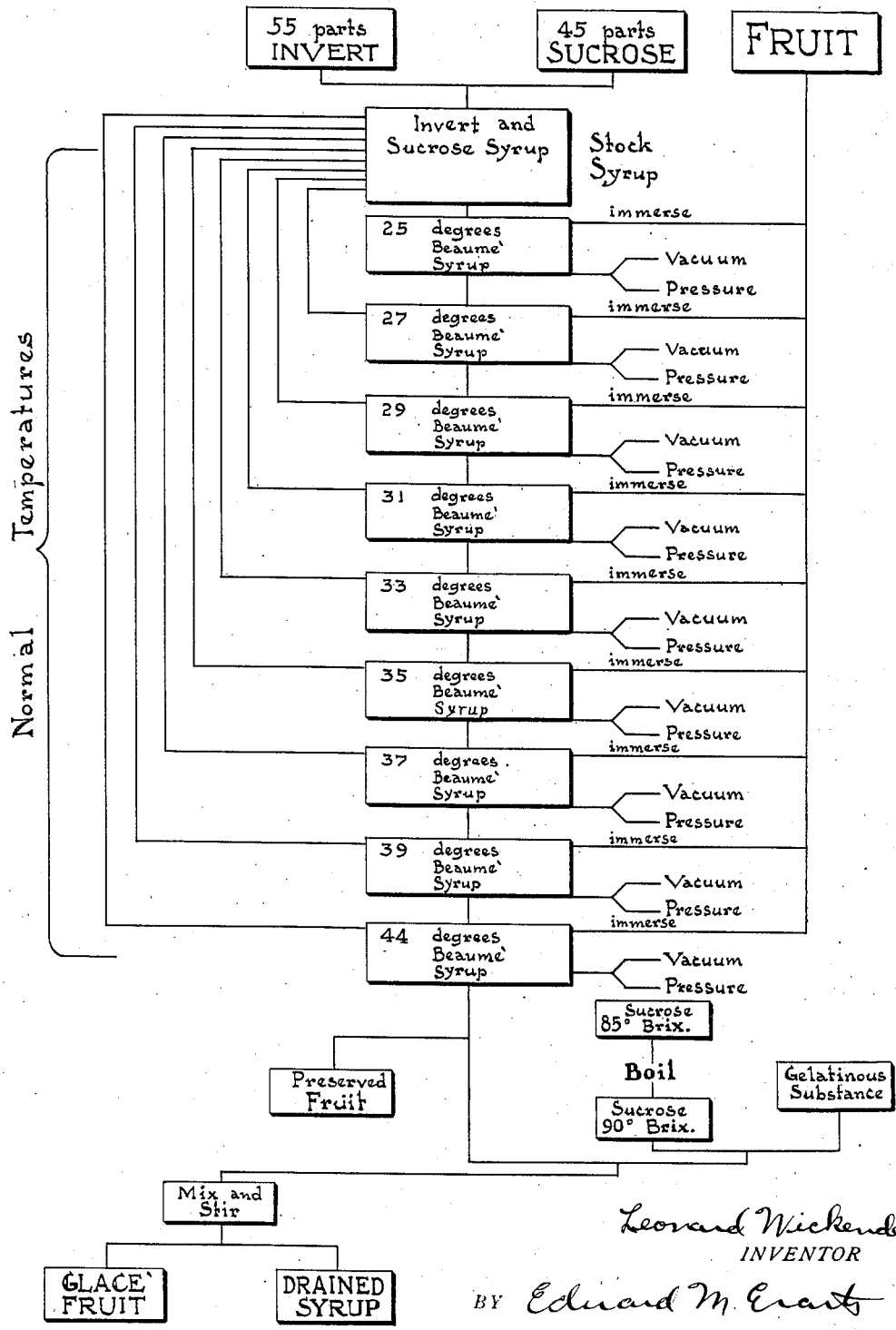

Patented May 2, 1933

1,906,295

UNITED STATES PATENT OFFICE

LEONARD WICKENDEN, OF MANHASSET, NEW YORK, ASSIGNOR OF ONE-HALF TO JOHN J. NAUGLE, OF GREENWICH, CONNECTICUT

METHOD OF PREPARING FRUIT CONFECTIONS AND THE LIKE

Application filed July 3, 1929. Serial No. 375,698.

My present invention relates to methods of treating fruits, as in preparing preserved and glacé fruits and the like, and aims to devise methods of the general character specified which are simple to practice, which require relatively simple apparatus for their practice, which shorten the time hitherto required for the production of such products, which result in numerous economies, which are applicable to a wide variety of fruits, and which produce superior products characterized by their superior flavor, their fine color and consistency, their texture which approximates that of the natural fruit, and the preservation in such products, to a very large extent, of the natural color, flavor and structure of the original fruits, treated in accordance with the methods of the present invention. Other objects and advantages of the methods of the present invention, particularly as exemplified in the following illustrative embodiments of the same, will in part be pointed out in detail hereinafter and will in part be obvious to those skilled in the art to which the present invention relates.

In the accompanying specification I shall describe, and in the annexed drawing more or less diagrammatically exemplify, several illustrative embodiments of the methods of the present invention. It is, however, to be clearly understood that my invention is not limited to the specific embodiments thereof herein shown and described for purposes of illustration only. In the accompanying specification I shall also describe several forms of products, particularly products resulting from the practice of the aforesaid illustrative embodiments of the methods of the present invention. It is, however, to be clearly understood that the aforesaid illustrative embodiments of the methods of the present invention are not restricted in their use to the production of the aforesaid forms of the resulting products, or any of them, nor are such forms of the products restricted to their production by means of the aforesaid illustrative embodiments of the methods of the present invention, or any of them, the products themselves forming no necessary part of the present invention but being fully described and being fully claimed in a copending application of mine filed of even date herewith and entitled "Fruit confections and the like".

Referring to the drawing, in which I have more or less diagrammatically exemplified the aforesaid illustrative embodiments of the methods of the present invention:

Fig. 1 is a diagrammatic view exemplifying certain of the steps of the aforesaid illustrative forms of the methods of the present invention.

Referring now to the aforesaid illustrative embodiments of the methods of the present invention, and with particular reference to the drawing more or less diagrammatically illustrating the same, I may use a very wide variety of fruits in accordance with the principles of the present invention, since the color and texture of such fruits are only moderately modified by the treatments in accordance with the methods of the present invention, much less so than in the case of the methods hitherto employed for the treatment of fruits, as in preparation of preserved and glacé fruits. For example, I may treat pineapple, preferably in a previously cooked condition, as in canned pineapple, in accordance with the methods of the present invention. Similarly, I may treat the citrous fruits, preferably in a raw or uncooked condition, such as oranges, lemons, tangerines and grapefruit, preferably in sections with their skins on them but after the peel has been carefully removed. I may also treat such fruits as apples, crab apples, pears, quince, peaches and plums, either in their raw or dry conditions, properly sectioned if so desired and with the skin and core removed. Finally, I may even treat cherries and berries, since the present invention is capable of handling the most delicate fruit structures without destruction, it being understood, of course, that certain modifications in the process will be dictated by the character of the particular fruit being treated in accordance with the principles of the present invention.

Taking, for example, the case of pineapple, and assuming the use of pineapple which has already been cooked, as canned pineapple, for example, I subject the same to a treatment substantially as follows: I take first a syrup of suitable density and composition. Preferably I use an invert sugar syrup. Such a syrup preferably contains cane sugar. Invert sugar, at normal temperature and in a saturated solution contains approximately 66% of solids. Above this concentration, the solution tends to crystalize in the form of dextrose. Cane sugar, also known as sucrose, has a solubility of approximately 66.6% of solids at normal temperature and at higher concentrations, becomes supersaturated and tends to crystallize in the form of sucrose. I prefer to use these two sugars substantially in the proportions in which they should be present in the final glacé or other treated fruit, apart from the sugar glaze thereon, for proper consistency. If too much invert sugar is used the fruit will have a tendency to be mushy due to the crystallization of dextrose. If too much sucrose is used the fruit will have a tendency to be gritty due to the crystallization of sucrose. In fact, one great difficulty with the methods hitherto employed for making glacé or preserved fruits is that on account of the acid character of many fruits the composition of the final syrup with which the finished fruit is impregnated is, due to inversion changes, indeterminate and variable, often resulting in fruit which is unsatisfactory and of improper consistency on one ground or another. I have found that, on the whole, a syrup containing, in its sugar content, based on the sugar content in the solid condition, about 55 parts of "invert sugar" and about 45 parts of sucrose, gives the most satisfactory results.

I therefore start with a sugar syrup having these proportions of invert and sucrose. Since the syrup impregnating operations about to be described preferably take place at normal temperatures, there will be little inversion and thus the fruit will be impregnated with a syrup of the desired composition, which composition will be substantially maintained during the entire impregnating steps and in the final preserved or glacé fruit itself without substantial modification, so that the composition of the syrup in the finished glacé fruits will be predetermined and of the desired constitution to yield a fruit of the desired consistency. For this purpose I may prepare a stock of concentrated syrup containing about 55 per cent. of invert and about 45 per cent. of sucrose based on the weight of the sugars in their solid condition. I may use this stock syrup to obtain the syrups of the various densities shortly to be enumerated.

In accordance with the principles of the present invention, I prefer to impregnate the fruits which are to be made into glacé or preserved fruits in partially inverted and partially sucrose sugar syrups of successively increasing densities. Preferably these syrups contain at all times the proportions of invert and sucrose enumerated above. For example, I may start off with a syrup of a density of about 25 degrees Beaumé, followed by a treatment with a syrup of about 27 degrees Beaumé, preferably, obtained by bringing the previous syrup up to the desired density by the addition of some of the stock syrup referred to above. The next step may be impregnation with the syrup of about 29 degrees Beaumé, then with a syrup of about 31 degrees Beaumé, then with a syrup of about 33 degrees Beaumé, then an impregnation with a syrup of about 35 degrees Beaumé, then an impregnation with a syrup of about 37 degrees Beaumé, followed by an impregnation with a syrup of about 39 degrees Beaumé, and finally an impregnation with a syrup of about 44 degrees Beaumé. Or I may start with an impregnation with a syrup of about 30 degrees Beaumé, followed by an impregnation with a syrup of a density of about 36 degrees Beaumé, followed by an impregnation with a syrup of a density of about 44 degrees Beaumé. Or I may start with an impregnation with a syrup of about 36 degrees Beaumé, followed by an impregnation with a syrup of a density of about 39 degrees Beaumé, followed by an impregnation with a syrup of a density of about 44 degrees Beaumé.

Each impregnation preferably takes place at normal temperatures. Each impregnation, furthermore, preferably is effected with an invert syrup, that is, with a syrup containing a substantial part, at least of invert sugar, together with sucrose, the two being preferably in the proportion of about 55 parts by weight of the solid sugar in the case of the invert, and 45 parts by weight of the solid sugar in the case of the sucrose, so as to yield a final glacé or other treated fruit in which such sugars are present in substantially these proportions so that the glacé or preserved fruit will have the desired consistency.

By effecting the successive impregnation with syrups of successively increasing densities at normal temperatures, the fruit will lose less of its natural color and less of its flavor than would otherwise be the case. Furthermore, the inversion of the sucrose sugar to invert sugar is minimized at normal temperatures, even in the presence of the acid juices which the acid fruits normally contain. Finally, at normal temperatures there will be less tendency to disintegrate the fruit and to deprive it of its natural structure. All of these factors increase the desirability of the finished product.

As already stated, I prefer to obtain the syrups of increasing densities by adding the stock syrup referred to above to the syrup previously used. On the other hand, if so desired, fresh batches of syrup of the desired density may be employed and the mother liquors of the syrups after the impregnations have been effected may be mixed together and brought up to the desired density for any other impregnation which may be desired. It may here be stated that since the successive impregnations take place at normal temperatures, the syrups are discolored and contaminated much less than is the case where temperatures higher than normal are employed for the impregnations. However, since such mother liquors or residual syrups are flavored by the fruits which have been immersed in them, they should be used only for further treatments of the same species of fruits.

The fruit thus impregnated will be found to be impregnated with an invert sugar and sucrose syrup of predetermined composition in which the sugar components, based on their weight in the solid condition, will approximate such components in the invert sugar syrups used, that is, about 55 parts by weight of invert to about 45 parts by weight of sucrose in the specific examples given. The fruit will be found, furthermore, to have retained a large part of its original color, structure and flavor free from the deflavorizing, disintegrating and decolorizing effects brought about by the methods hitherto employed by the prior art for preparing glacé and other saccharized fruits, such as preserved fruits.

I may now proceed to glaze the fruits obtained as above described. In doing so, I first prepare a boiling solution of sucrose of about 85 degrees Brix which I boil off until it acquires a density of about 90 degrees Brix. To this I add a few drops of a solution of a gelatinous or gelatinizing substance such as gum tragacanth. I find that the addition of such a substance retards the crystallization of the sucrose in the glazing and improves its consistency, giving it more or less the character of an "icing", which is desired. As soon as the temperature of this syrup with the few drops of the gum solution added thereto, has dropped to about 90 degrees C., the sections of syrup-impregnated fruit are added and kept in the hot syrup until its temperature falls to about 85 degrees C., which takes place in about five or ten minutes. During all this time the fruit is vigorously stirred in the syrup, which latter is then removed, drained and the glaze so prepared will be found to have a superior appearance and to provide an ideal glaze or "icing" for the syrup-impregnated fruit sections.

In some cases instead of preparing a glacé fruit I find it desirable to pack the impregnated fruit in sufficient syrup to keep it covered. This is particularly valuable in the case of berries of different kinds, for example strawberries, as the method of preservation is very simple and economical to carry out and preserves the fruit in an unbroken condition and possessing a flavor and texture which is highly desirable in jam making or for any other purpose where the natural size and shape of the fruit is required. I find that fruit preserved in this manner forms a preserve having much more of the natural flavor and texture of the original fruit than can be obtained by any of the present methods where relatively high temperatures are used.

This completes the description of the aforesaid illustrative embodiments of the methods of the present invention. It will be noted that such methods are simple to practise and may be conveniently and econominically practised with the simplest type of apparatus. It will be noted, also, that the different syrup-impregnating steps are conducted at normal temperatures, thus avoiding the heating operations customarily employed in the prior art and which tend to destroy a substantial part, at least, of the natural color, natural flavor and the natural structure of the fruits. Furthermore, since the various syrup-impregnating steps are preferably conducted at normal temperatures, there is a minimum loss of syrup, since the syrup, under the defined conditions, has less tendency to become contaminated and darkened and since even the mother liquors for each impregnation may be used in various stages of the process. Since the syrups used for impregnation are preferably not heated, there is little coloring and little inversion, with the result that the syrup at all times retains substantially its initial average composition as far as sugar ingredients are concerned, although the density of the syrup varies from impregnation to impregnation and during the same impregnation as the fruit is more and more impregnated with the syrup. Thus the syrups are substantially clear during the entire process, the fruit is clearer and the finished product clearer than where the usual heating operations are employed at each impregnation.

The product itself is characterized by its superior structure, flavor, color and consistency. Due to the fact that the use of heat has preferably been avoided at the different impregnating steps, the fruit loses a minimum of its structure, color and flavor. Furthermore, since each impregnation preferably takes place with an invert syrup, the constituents of which are predetermined so as to be of substantially the same composition, as far as sugar ingredients are concerned, as the syrup intended to be present in the final glacé or other treated fruit, such fruit will have a syrup of predetermined composition in it and will thus be of the desired consistency, neither too mushy nor too gritty. The fruit, due to the economies referred to above, while possessing the numerous superiorities referred to above, is relatively cheap and since the usual cooking operations are omitted, a wide variety of fruits, including the most delicate, may be successfully treated by the methods of the present invention in the production of superior glacé or other treated fruits of various sorts, such as the citrus fruits, pineapples, apples, pears and the like, berries and cherries.

Other superiorities and advantages of the methods of the present invention, particularly as exemplified in the aforesaid illustrative embodiments of the same, will be obvious to those skilled in the art to which the present invention relates, it being understood that the product itself is claimed in my copending application referred to above.

What I claim as my invention is:

The method of preparing glacé and other preserved fruits and the like, which comprises the steps of impregnating fruit successively, at normal temperatures, with syrups of increasing densities, each of said syrups containing a mixture of sucrose and invert syrups, in the approximate proportions, by weight of sugar solids contained therein, of about forty-five parts of the former sugar to about fifty-five parts of the latter sugar by immersing said fruit in such syrups, and subjecting such syrups while said fruit is immersed therein to the successive actions of degrees of vacua substantially lower than atmospheric pressure alternating with degrees of pressure substantially higher than atmospheric pressure.

In testimony, whereof, I have signed my name to this specification this 24th day of June, 1929.

LEONARD WICKENDEN.